(12) United States Patent
Graham, Jr. et al.

(10) Patent No.: US 6,698,549 B2
(45) Date of Patent: *Mar. 2, 2004

(54) CLIMBING TREE STAND

(75) Inventors: Thomas E. Graham, Jr., Wilmington, NC (US); Thomas E. Graham, Sr., Wilmington, NC (US); Christopher L. Graham, Wilmington, NC (US)

(73) Assignee: Buckshot, Inc., Wilmington, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/388,039

(22) Filed: Mar. 13, 2003

(65) Prior Publication Data

US 2003/0173154 A1 Sep. 18, 2003

Related U.S. Application Data

(60) Provisional application No. 60/364,472, filed on Mar. 15, 2002.

(51) Int. Cl.$^7$ ............................................. A01M 31/00
(52) U.S. Cl. ...................................................... 182/136
(58) Field of Search ............................... 182/135, 136, 182/187, 188, 116

(56) References Cited

U.S. PATENT DOCUMENTS

| | | | |
|---|---|---|---|
| 4,331,216 A | | 5/1982 | Amacker |
| 4,488,620 A | * | 12/1984 | Gibson ........................ 182/135 |
| 4,553,634 A | | 11/1985 | Roberts et al. |
| 4,597,473 A | | 7/1986 | Peck |
| 5,097,925 A | | 3/1992 | Walker, Jr. |
| 5,101,934 A | | 4/1992 | Zumbro |
| 5,156,236 A | | 10/1992 | Gardner et al. |
| 5,234,077 A | | 8/1993 | Sheriff |
| 5,297,656 A | * | 3/1994 | Amacker ..................... 182/187 |
| 5,316,104 A | | 5/1994 | Amacker |
| 5,379,861 A | | 1/1995 | Amacker |
| 5,439,074 A | * | 8/1995 | Trout et al. ................. 182/187 |
| 5,492,198 A | | 2/1996 | Williams |
| 5,975,242 A | | 11/1999 | Woller et al. |
| 6,308,801 B1 | * | 10/2001 | Futch .......................... 182/136 |
| 6,523,642 B1 | * | 2/2003 | Graham et al. ............. 182/136 |
| 2003/0029675 A1 | * | 2/2003 | Prejean ........................ 182/136 |

* cited by examiner

Primary Examiner—Alvin Chin-Shue
(74) Attorney, Agent, or Firm—MacCord Mason PLLC

(57) ABSTRACT

A tree stand includes a standing section with attachment members, a releasable standing section lashing member attachable to the standing section attachment members, a seating section including seating section attachment members having upper and lower surfaces, and a plurality of spaced holes extending between the upper and lower surfaces, and a seating section lashing member having first and second ends with handles positionable on the upper surfaces of the seating section attachment members, the handles including projections releasibly attachable in selected holes in the seating section attachment members. The tree stand may also include at least one adjustable tie-down strap attachable between the standing section outer end and the standing section inner end, and tree grippers with spaced, parallel trunk-contacting blades attached to the inner ends of the standing and seating sections.

21 Claims, 4 Drawing Sheets

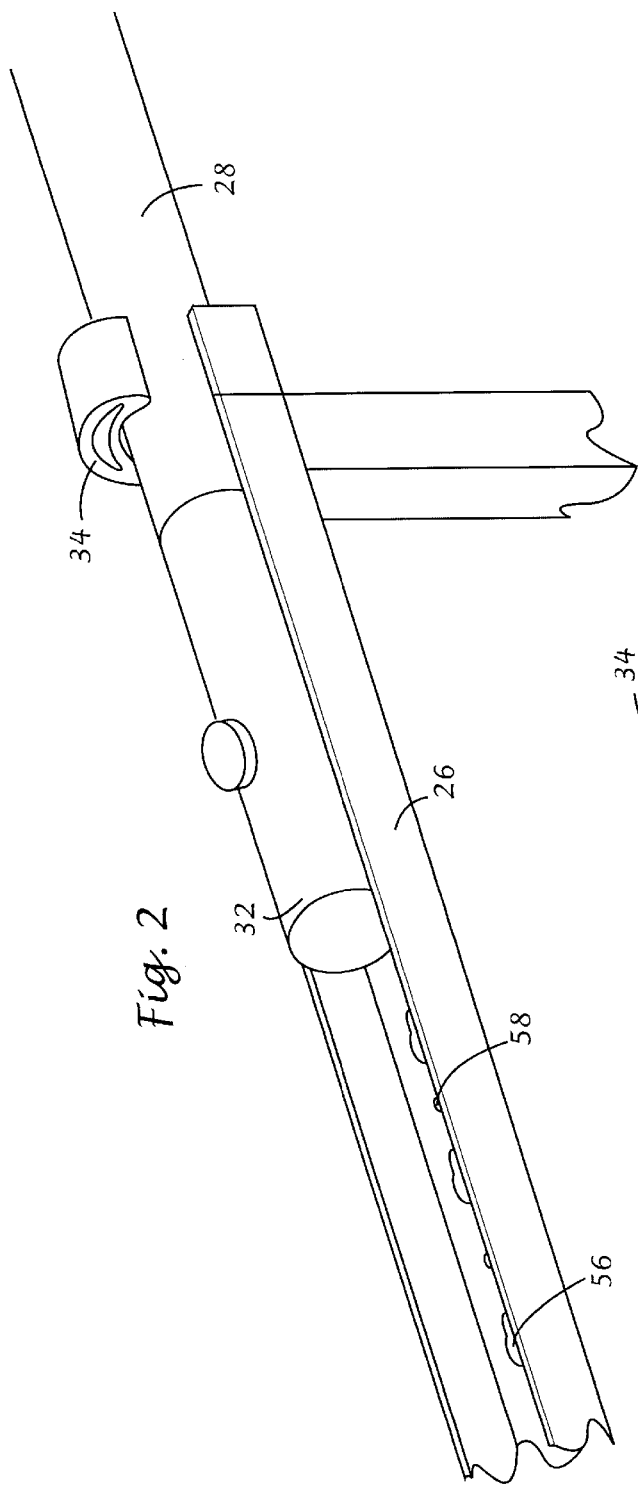
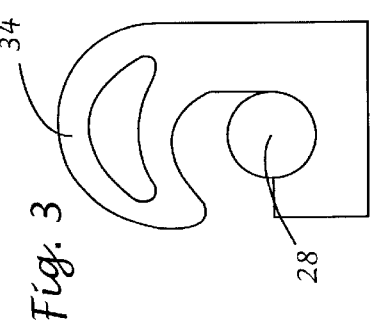

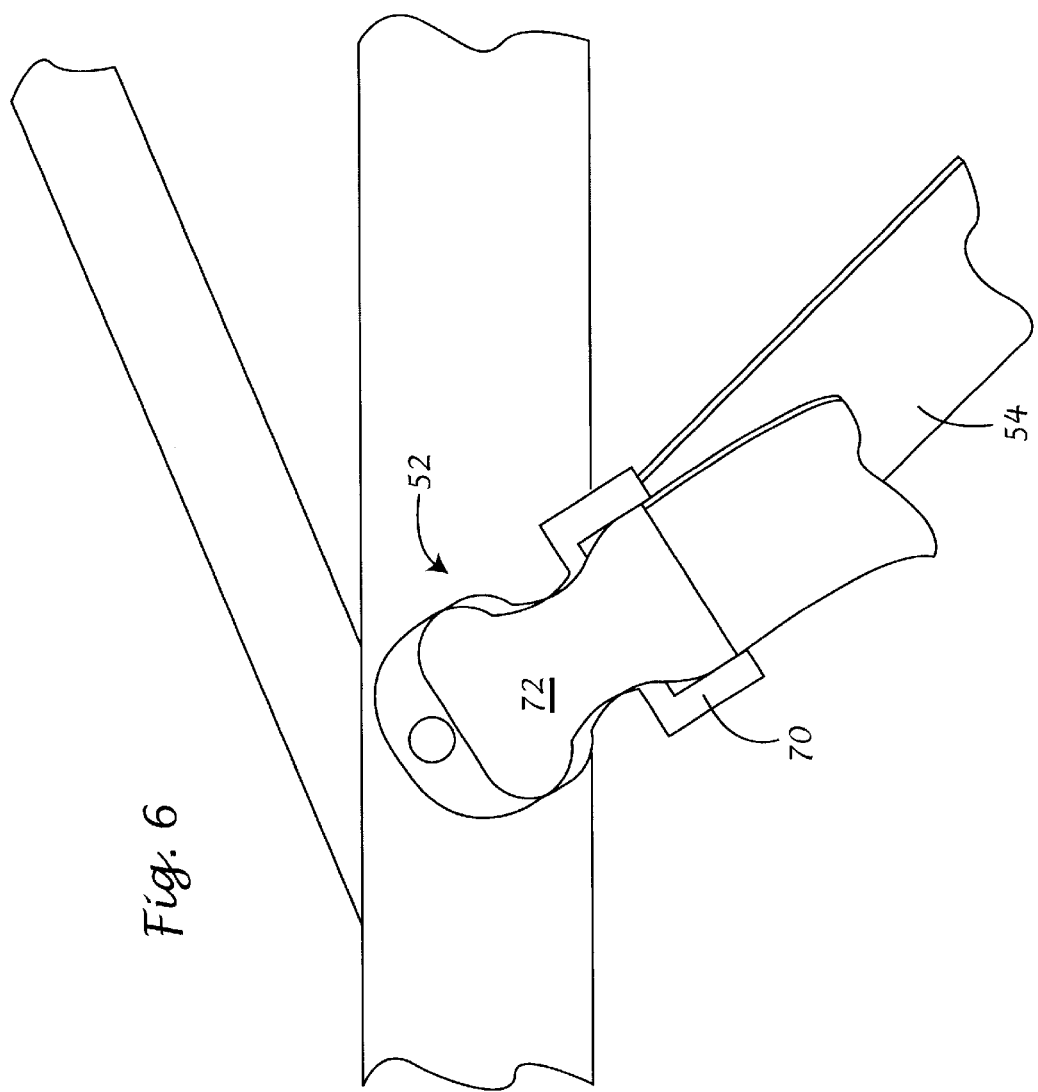

CLIMBING TREE STAND

This application claims the benefit of provisional application Serial No. 60/364,472, filed Mar. 15, 2002.

BACKGROUND OF THE INVENTION (1) Field of the Invention

The present invention relates generally to a tree stand of the type used by hunters to ascend a tree and provide an elevated seat thereon, and in particular to a tree stand that can be adjusted as the hunter ascends or descends the tree to provide a level and secure platform.

(2) Description of the Prior Art

Tree stands used to provide an elevated seat for hunters are well known in the prior art. One type of stand, known as a climbing tree stand, is constructed of a seating section and a standing section. The sections are attached to a tree with the seating section being above the standing section. The hunter then raises the sections in an alternating fashion to elevate the stand to the desired height on the tree.

Stand sections are releasibly secured to the tree by flexible attaching members that extend around the tree from one side of the stand section to the other side. U.S. Pat. Nos. 6,182,792; 5,234,076 and 5,097,925 are all examples of climbing tree stands using flexible cables as attaching members. While cable has various advantages over other attaching means, these prior art disclosures require insertion of one or both ends of a support cable into relatively narrow support arm tubes, and then inserting a pin through a hole in the side of the tube and a hole in the end of the cable in order to secure the cable in place. Threading a cable inside a narrow tube while at the same time attempting to locate a cable attachment point is cumbersome in daylight, and nearly impossible at night.

Commonly assigned U.S. Pat. No. 6,523,642, issued Feb. 25, 2003, incorporated herein by reference, describes a climbing tree stand constructed to enable the hunter to quickly attach a cable to the tree stand section without having to thread the cable into a tube. Generally, each frame section of the tree stand described in that application includes cable attachment members on each side of the frame, and a cable that is extendable around the tree trunk from one attachment member to the other and releasibly attachable to one of the attachment members by a unique attachment means.

At least one of the attachment members, preferably both attachment members, includes an exterior side with a plurality of first mating elements adapted to mate with a corresponding second mating element adjacent one end of the lashing member. The mating element on the attachment member on the cable is in the form of a projection, while the other mating element is a recess or hole, with the projection element being removably insertable into the recess. The projection element is moveable within the recess from an insertion position to a locked position when said cable is tensioned. In the locked position, the projection is prevented from being removed from the attachment member. Preferably, the attachment members described in that application have outer and inner walls, the recesses are holes, and the projection includes a flange, cap or other component that abuts the inner wall of the attachment member when the projection is in the locked position.

While the attachment mechanism described in U.S. Pat. No. 6,523,642 is a significant improvement over prior art stands requiring insertion of a cable end into a tube, alignment of the cable with the attachment members can sometimes be difficult. Furthermore, the cable may not be held outwardly from the tree trunk as needed for optimum stability. Thus, there is still a need for further improvements to facilitate attachment of adjustable cables to tree stand sections.

Additionally, there is still a need to increase the stability of climbing tree stands, and in particular the movement of the seat section of tree stands once the tree stand has been secured to the tree and is being used by the hunter. Also, there is a need for a means for reliably securing tree stand sections to a tree without significant damage to the tree.

SUMMARY OF THE INVENTION

The present invention is directed to a hunting tree stand that is constructed to address these needs. Generally, the tree stand of the present invention, like the tree stand described in U.S. Pat. No. 6,523,642 and prior art tree stands, is comprised of a standing section and a seating section. The standing section includes a frame with an inner end and an outer end connected by side members, and a platform supported on the frame. A tree gripper or gripping section extending inwardly from the inner end of the frame. The seating section is similarly constructed with a frame having inner and outer ends connected by side members, and a tree gripping section extending inwardly from the inner end of the frame. Instead of a standing platform, the seating section includes a seat, which may be fixed or moveable, supported by the frame.

Like the tree stand in Ser. No. 09/947,254, each frame section of the present tree stand includes support or attachment members on each side of the frame, and a cable or other lashing member that is extendable around the tree trunk from one attachment member to the other, and releasibly attachable to one of the attachment members by a unique attachment means. At least one of the attachment members, preferably both attachment members, includes an exterior side, e.g., the top side or outer side, with a plurality of first mating elements adapted to mate with a corresponding second mating element adjacent one end of the lashing member.

As used herein, the term "lashing member" is intended to include elongated flexible, straps or bands that are of a sufficient length to extend around an average tree from one side of attachment member to the other. Exemplary lashing members include cables, cords, ropes, woven straps, etc. Preferably, the lashing member is a twisted wire cable with a smooth sleeve, such as a wear-resistant plastic sleeve.

One of the mating elements is in the form of a projection, while the other mating element is a recess, the term including a hole, with the projection element being removably insertable into the recess. The projection element is moveable within the recess from an insertion position to a locked position when said cable is tensioned. In the locked position, the projection is prevented from being removed from the attachment member. Preferably, the attachment member has outer and inner walls, the recesses are holes, and the projection includes a flange, cap or other component that abuts the inner wall of the attachment member when the projection is in the locked position.

Normally, the attachment members will be attached on either side of each frame. The attachment member may be inclined towards the inner end of the standing section frame. The attachment member may be a rectangular tube with four sides, each side having an exterior and an interior surface. Preferably, the attachment member is a solid bar with upper and lower surfaces. The attachment member preferably includes a plurality of equidistant mating elements extending axially along the upper surface of the attachment member.

In a preferred embodiment, each attachment member is an inclined solid bar with upper and lower surfaces, and a plurality of axially aligned holes extending between the bar upper and lower surfaces. The lashing member is a cable with an attachment handle at each end. Each attachment handle includes at least one projection that is insertable into a hole in the attachment member, with the projection being moveable within the hole between an insertion position and a locked position when the cable is tensioned.

The projection may include a distal end with flange or cap adapted to engage the inner surface of the attachment member when the projection is in the locked position. Preferably, each of the holes has an insertion end of a first given width and a locking end of a second given width, and the projection includes an end cap with a third given width, with the third given width being less than said first given width and greater than said second given width, whereby the end cap prevents removal of the projection from the hole when the projection is in the locked end of the hole.

In order to hold the projection in the locked position during use of the tree stand, even if the tension on the cable is temporarily relieved, such as when the stand is being moved to a different position on the tree, each attachment handle preferably also includes a latch member to hold the projection in the locked position, with the attachment member including a latch recess, such as a latch hole, to receive the latch member. The latch member may be a retractable latch pin having an inner end for insertion into the recess, and an outer end with a gripping element to manipulate the latch pin. The latch pin may include an extended position and a retracted position, with a spring to urge the latch member to its extended position and hold the latch in the recess during use. Alternatively, the pin may be threaded, so that it is inserted and retracted by rotating the pin. For example, the pin can be rotated clockwise to the extended, locked position, and rotated counterclockwise to the retracted, unlocked position.

To minimize the projection of the attachment handle and cable from the attachment member, and thereby reduce the risk of snagging, the outer surface of the attachment member may include an axially aligned trough, e.g., a semi-circular trough, to receive the attachment handle and the cable. For example, the trough may be on the upper side of the attachment member with the holes in the bottom of the trough.

The above construction is further modified in the present invention by the inclusion of a cable guide at the inner end of each attachment member to which the cable is releasably attached. Each guide is preferably a C-shaped guide with an open side for receiving the cable. The guide opening preferably extends outwardly from the attachment member so that the cable-receiving interior of the guide is aligned with the attachment member. The opening into the guide is preferably approximately equal to the diameter of the cable. While the open side of the guide may extend upwardly, the open side preferably extends to the side of the stand, with the attachment side or cable-receiving trough of the attachment member extending upwardly.

The tree stand of the present invention also includes adjustable tie-down straps to hold the stand sections, and in particular the seat section firmly against the tree trunk when in use. Climbing tree stands that include safety straps are well known in the prior art. Basically, safety straps are attached between the seating and standing sections of a tree stand, and prevent the seating section of the stand from accidentally falling or slipping beyond the hunter's reach during climbing, thereby stranding the hunter up the tree. Safety straps, often made of woven nylon belting are securely attached at their upper and lower ends to the inner ends of the seating and standing sections, respectively. If the standing section slips downward, its descent is stopped by the strap, which can be used to pull the standing section back up the trunk.

In the present invention, the safety straps are attached at a different location and in a different way from prior art safety straps, and provide the additional function of holding the sections securely in position once the sections are at the desired height on the trunk. More specifically, the present tree stand includes two safety straps, one on either side of the stand. The lower end of each strap is secured to the standing section, preferably at the standing section inner end. For example, the lower ends of the straps can be attached to the C-shaped guides at the inner ends of the attachment arms.

The upper end of each safety strap is adjustably attached to the seating section at a point spaced from the seating section inner end. Preferably, the upper end of the safety strap is adjustably attached at one side of the seating section between the seating section midpoint and outer end by a buckle through which the strap can slide. Each buckle includes a strap insertion opening and a releasable latching member to lock the strap when the strap is inserted to the desired extent.

The tree stand of the present invention further includes uniquely configured tree grippers that provide improved stability to the stand sections while minimizing damage to the tree trunk. Most prior art tree stands include inwardly extending V-shaped grippers with outwardly extending arms that are held against the tree trunk. The inner, tree-engaging faces of prior art gripper arms normally include a single row of teeth with points or tips that are pressed into the tree trunk, which can damage the tree. In addition, the teeth can slip when the hunter's weight is placed onto the stand section.

Surprisingly, it has been found that the stand sections can be held more securely against the tree trunk, and the damage to the tree can be minimized with grippers that have inner tree-engaging faces that are comprised of a pair of spaced, parallel trunk-contacting projections or blades. While the blades may include inwardly extending protrusions, the tips of the protrusions may be blunted to minimize damage, since the gripping effect is achieved primarily by the parallel blades. Thus, the tree stand sections of the present invention preferably includes V-shaped grippers with outwardly extending arms, each of the arms having a pair of spaced, inwardly extending parallel blades to engage the tree trunk. These blades may include a plurality of projections. However, the projections can be blunted projections instead of tipped and still provide secure gripping.

In operation, a climber places the tree grippers of the standing section against a tree trunk and loops the standing section cable around the tree trunk. Usually, one end of the cable is already attached to the inner end of one attachment member. The climber positions the cable within the cable guide at the end of the attachment member and tensions the cable by pulling on a handle on the unsecured end of the cable.

Next, a first mating member on the unattached attachment member is selected such that when mated with a second mating member on the handle, the cable remains under tension. A plurality of first mating members on the attachment member generally takes the form of holes. The second mating members or member on the handle generally take the form of a projection or flanged stud.

Next, the climber inserts the handle projection into the insertion end of the selected hole. In order to lock the attachment handle to the attachment member, the climber moves the handle projection within the hole from the insertion end to the locked end. In a preferred embodiment the climber further secures the cable to the attachment member by releasing a spring-urged pin, or rotating a threaded latch pin, to extend the pin into a latch recess while the handle projection is in the locked position. This action latches the cable to the attachment member even in the event that the tension on the cable is relaxed. At this point the standing section is capable of supporting the climber's weight and can safely be stood upon.

Next, the climber places the seating section waist high and directly above the standing section making sure that the seating section tree gripping section is engaging the tree trunk. As with the standing section, one end of the cable normally is already attached to the inner end of one of the seating section attachment arms. Similar to the procedure described for the standing section, the climber loops or extends the free end of the seating section cable around the tree trunk and through the cable guide at the end of the attachment member. The climber then tensions the cable by pulling on a handle terminating the unsecured end of the cable. To hold the tension the climber selects the appropriate hole on the remaining attachment member, positions the handle projection within the insertion point of the hole and then moves the handle projection to the locked position. In order to further secure the cable to the attachment member the climber releases a spring-urged or threaded latch pin into a latch recess. The seating section is now ready to safely hold the climber's full weight.

To ascend the tree, the climber places his or her feet in a restraint extending across the standing section platform. The climber then rests his or her weight on the seat of the seating section while using his or her feet and legs to pull the standing section upward. The climber then stands and, using his or her hands, raises the seating section to a waist high position. The climber then sits and again raises the standing section with his or her feet and legs. The two stand sections are attached to each other by at least one, and preferably two, safety straps that are extended to the full length.

When the climber reaches the desired position on the tree trunk, he or she pulls on the upper end of each safety strap to shorten the strap. Since the upper ends of each safety strap extends through a buckle positioned on the side of the seating section frame, tightening of the safety straps urges the rear of the seating section downwardly, pushing the seating section tree gripper firmly against the tree trunk and preventing the seating section from movement. Preferably, one safety strap is positioned on each side of the stand section with the buckles located approximately midway between the inner and outer ends of the stand section.

BRIEF DESCRIPTION OF THE DRAWINGS

FIG. 2 is an enlarged perspective view of an attachment member and cable.

FIG. 3 is an end view of a cable guide.

FIG. 6 is a detailed view of a buckle with a safety strap extending through the buckle.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
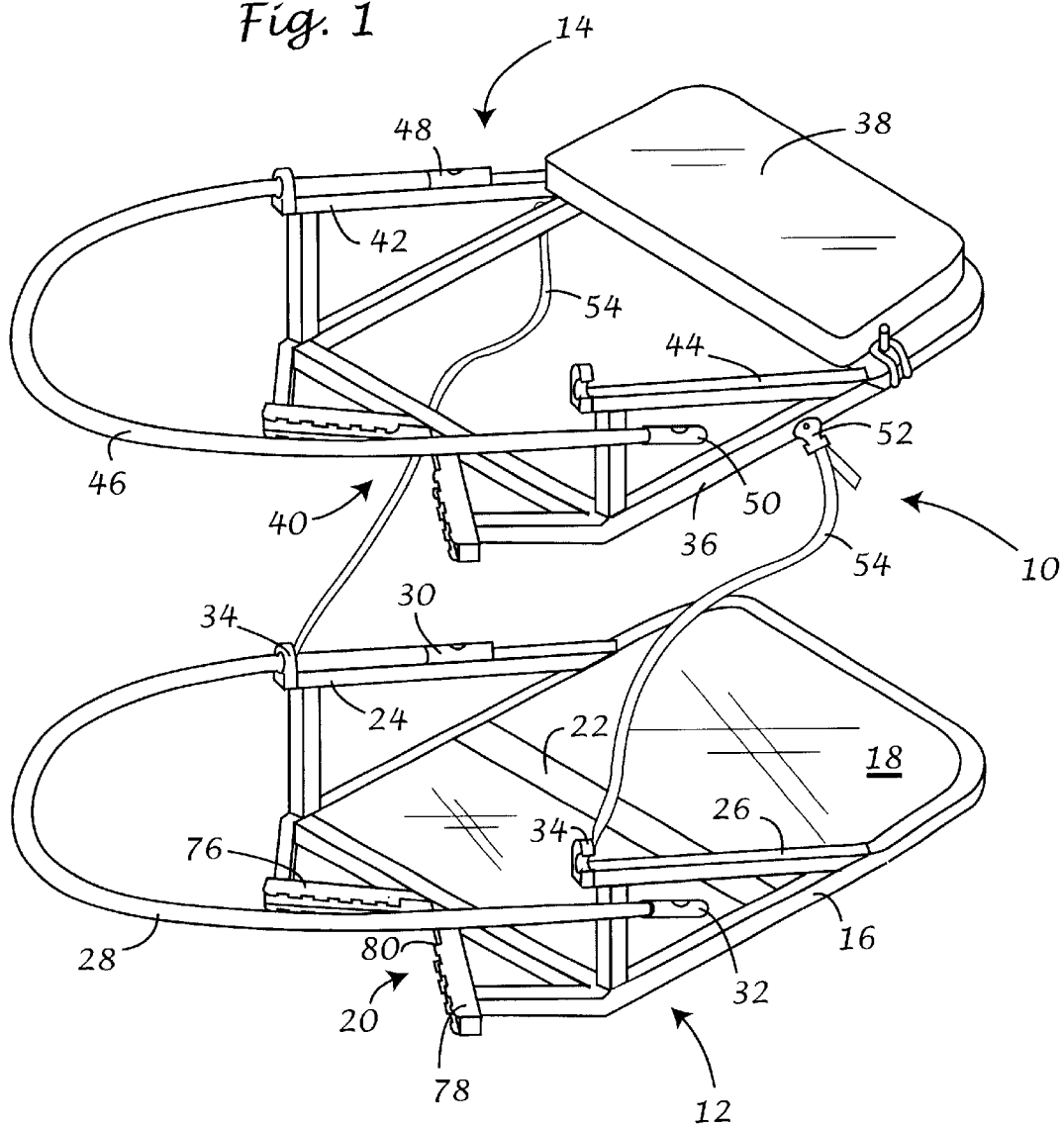
FIG. 1 is a perspective view of the tree stand showing the seating section and standing section.

Referring to the drawings and in particular to FIG. 1, tree stand 10 includes standing section 12 and seating section 14. Standing section 12 is comprised of frame 16, which includes inner and outer ends connected by side members. Platform 18 extends across frame 16. Tree gripper, generally 20, is positioned at the inner end of frame 16. A foot strap 22 under which the climber's feet can be inserted extends across platform 18. Cable attachment arms 24 and 26 incline upwardly from the sides of frame 16 towards the frame inner end. Standing section 12 also includes cable 28 having first and second ends with attachment handles 30 and 32. C-shaped cable guides 34 are mounted at the inner ends of arms 24 and 26. Guides 34 include cable channels that are axially aligned with arms 24 and 26, with the channels having openings toward the outer sides of arms 24 and 26.

Seating section 14 includes frame 36 having inner and outer ends connected by side members and seat 38 supported on frame 36. Tree gripper 40 extends inwardly from the inner end of frame 36. Cable attachment arms 42 and 44 incline upwardly from the sides of frame 16 towards the frame inner end. Seating section 14 also includes a cable 46 having first and second ends with attachment handles 48 and 50. Buckles 52 are attached on each side of frame 36 approximately midway between the frame inner and outer ends. Safety straps 54 extend from C-shaped guides 34 on frame 16 to buckles 52 on the corresponding side of frame 36. C-shaped cable guides 34 are also mounted at the inner ends of arms 42 and 44. Guides 34 include cable channels that are axially aligned with arms 42 and 44, with the channels having openings toward the outer sides of arms 42 and 44.

As illustrated in FIG. 2, each attachment arm, as represented by arm 24, is a solid bar with an elongated, axially aligned, semi-circular trough along its upper surface. A plurality of holes 56, each with an enlarged insertion outer end of a first given width and a smaller locking inner end are spaced equidistant from each other along the bottom of arm 24. Latch recess holes 58 alternate with holes 56. Handle 32 of cable 28 is shown attached to arm 24. Cable 28 extends through an outwardly facing cable guide 34 having an opening aligned with the inner end of arm 24. An end view of guide 34 is shown in FIG. 3.

Figure 4:
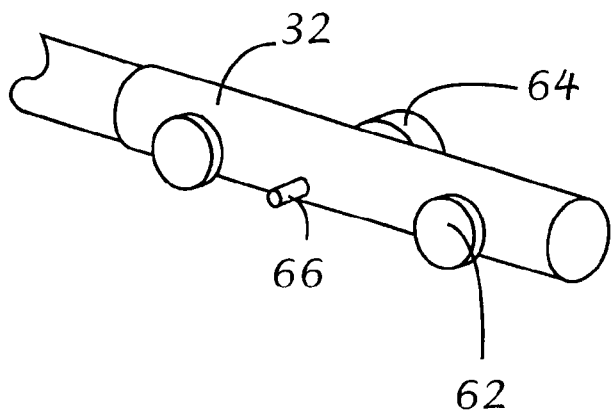
FIG. 4 is a perspective view of the inside of the cable attachment handle.
Figure 5:
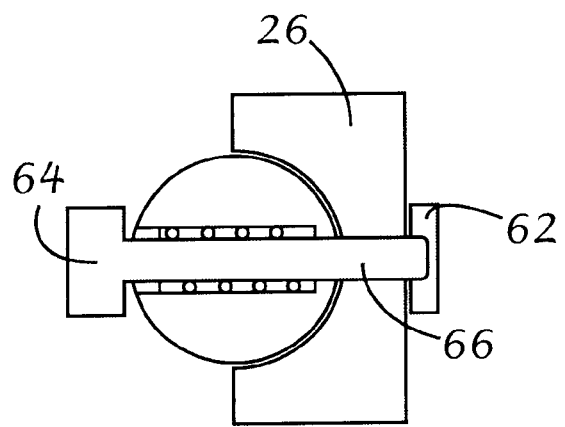
FIG. 5 is a sectional end view of an attachment handle in the locked and latched position.

As illustrated in FIGS. 4 and 5, handle 30, as well as handles 32, 48 and 50, includes flanged or capped studs 62 located opposite a knob 64 attached to the upper end of retractable latch pin 66. The width of the cap of each stud 62 is less than the outer end of hole 56 and greater than the width of the inner end of each hole 56. Thus, each stud 62 is prevented from upward detachment when in the locked position. Latch pin 66, when inserted into hole 58, prevents stud 62 from moving rearwardly from the locked position to the insertion position in the event cable tension is lost.

FIG. 6 illustrates a buckle 52 attached to a side of frame 36. Buckle 52 is comprised of a lower section 70 having a strap insertion opening and a spring loaded upper section 72 urged against lower section 70 to clamp strap 54 in the desired position.

Gripper 20 includes outwardly extended arms 74 and 76, each having an inner face with a pair of spaced, parallel, inwardly extending blades 78 with blunted teeth 80. Gripper 40 is similarly constructed.

Certain modifications and improvements will occur to those skilled in the art upon a reading of the foregoing description. It should be understood that all such modifications and improvements are to be considered within the scope of the invention.

What is claimed is:

1. A tree stand for use in climbing a tree comprising:
  a) a standing section including standing section attachment members;
  b) a standing section lashing member having first and second ends releasibly attachable to said standing section attachment members;
  c) a seating section including seating section attachment members having upper and lower surfaces, and a plurality of spaced holes extending between said upper and lower surfaces; and
  d) a seating section lashing member having first and second ends with handles positionable on the upper surfaces of said seating section attachment members, said handles including projections releasibly attachable in selected holes in said seating section attachment members, wherein said seating section attachment member holes have an insertion end of a first given width and a locking end of a second given width, and at least one handle of said seating section lashing members has a projection including an end cap with a third given width, said third given width being less than said first given width and greater than said second given width, whereby said end cap prevents removal of said projection from said hole when said projection is in the locking end of said hole.

2. The tree stand of claim 1, wherein said standing and seating sections have inner and outer ends and a mid-point between said inner and outer ends, said tree stand further including at least one adjustable tie-down strap having a first end attachable to said standing section between said standing section mid-point and inner end, and a second end attachable to said seating section between said seating section mid-point and outer end.

3. The tree stand of claim 1, wherein said seating section attachment members includes inner and outer ends, the locking end of said holes being toward said inner ends.

4. The tree stand of claim 1, wherein said attachment members are solid bars.

5. The tree stand of claim 1, wherein said seating section lashing member handles include latching means to releasibly secure said seating section lashing member handles to said seating section attachment members.

6. The tree stand of claim 1, further including lashing member guides attached at the inner ends of said seating section attachment members.

7. The tree stand of claim 6, wherein said guides are outwardly projecting C-shaped guides.

8. The tree stand of claim 1, wherein said seating section attachment member upper surfaces include axially aligned troughs for receiving said lashing members.

9. The tree stand of claim 1, wherein said standing section attachment members have upper and lower surfaces, and a plurality of spaced holes extending between said upper and lower surfaces, and said standing section lashing member has first and second ends with handles positionable on the upper surfaces of said standing section attachment members, said handles including projections releasibly attachable in selected holes in said standing section attachment members.

10. The tree stand of claim 9, wherein said standing section attachment member holes have an insertion end of a first given width and a locking end of a second given width, and at least one handle of said standing section lashing member has a projection including an end cap with a third given width, said third given width being less than said first given width and greater than said second given width, whereby said end cap prevents removal of said projection from said hole when said projection is in the locking end of said hole.

11. The tree stand of claim 1, wherein said standing and seating sections have inner and outer ends and a mid-point between said inner and outer ends, said tree stand further including tree grippers attached to the inner ends of said standing and seating sections, each of said grippers including first and second, spaced, parallel trunk-contacting blades.

12. A tree stand for use in climbing a tree comprising:
  a) a standing section including standing section attachment members, an inner and outer end, and a midpoint between said inner and outer ends;
  b) a releasable standing section lashing member attachable to said standing section attachment members;
  c) a seating section including seating section attachment members having upper and lower surfaces, and a plurality of spaced holes extending between said upper and lower surfaces;
  d) a seating section lashing member having first and second ends with handles positionable on the upper surfaces of said seating section attachment member, said handles including projections releasibly attachable in selected holes in said seating section attachment members;
  e) at least one adjustable tie-down strap having a first end attachable to said standing section between said standing section mid-point and inner end, and a second end attachable to said seating section between said seating section mid-point and outer end; and
  f) tree grippers attached to the inner ends of said standing and seating sections, each of said grippers including first and second, spaced, parallel trunk-contacting blades, wherein said seating section attachment member holes have an insertion end of a first given width and a locking end of a second given width, and at least one handle of said seating section lashing members has a projection including an end cap with a third given width, said third given width being less than said first given width and greater than said second given width, whereby said end cap prevents removal of said projection from said hole when said projection is in the locking end of said hole.

13. The tree stand of claim 12, wherein said seating section lashing member handles include latching means to releasibly secure said seating section lashing member handles to said seating section attachment members.

14. The tree stand of claim 12, further including lashing member guides attached at the inner ends of said seating section attachment members.

15. The tree stand of claim 12, wherein said seating section attachment member upper surfaces include axially aligned troughs for receiving said lashing members.

16. The tree stand of claim 12, wherein said standing section attachment members have upper and lower surfaces, and a plurality of spaced holes extending between said upper and lower surfaces, and said standing section lashing member has first and second ends with handles positionable on the upper surfaces of said standing section attachment members, said handles including projections releasibly attachable in selected holes in said standing section attachment members.

17. The tree stand of claim 16, wherein said standing section attachment member holes have an insertion end of a first given width and a locking end of a second given width, and at least one handle of said standing section lashing member has a projection including an end cap with a third given width, said third given width being less than said first given width and greater than said second given width, whereby said end cap prevents removal of said projection from said hole when said projection is in the locking end of said hole.

18. The tree stand of claim 12, said standing section and said seating section each include a left side and a right side, said stand including a first adjustable tie-down strap having a first end attachable to said standing section left side between said standing section mid-point and inner end, and a second end attachable to said seating section left side between said seating section mid-point and outer end, and a second adjustable tie-down strap having a first end attachable to said standing section right side between said standing section mid-point and inner end, and a second end attachable to said seating section right side between said seating section mid-point and outer end.

19. The tree stand of claim 12, wherein each of said blades includes inwardly extending protrusions.

20. The tree stand of claim 12, wherein said protrusions have blunted tips.

21. The tree stand of claim 12, wherein said tree grippers are V-shaped grippers with outwardly extending arms, each of the arms having a pair of spaced, inwardly extending parallel blades.

* * * * *